Oct. 6, 1964     R. MARCHANT     3,152,253
RECORDING DIRECTION FINDER OF BURSTS OF RADIATION
Filed April 26, 1956
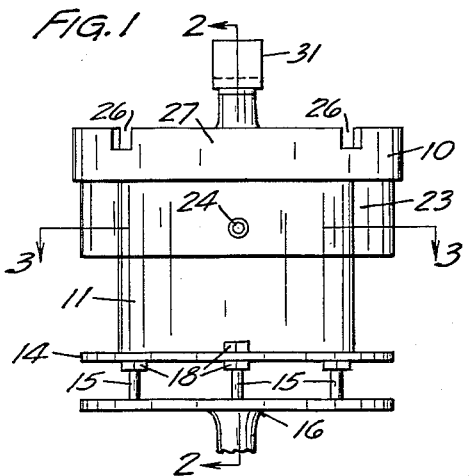
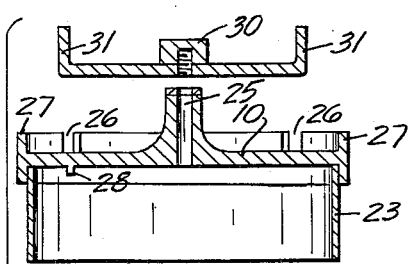
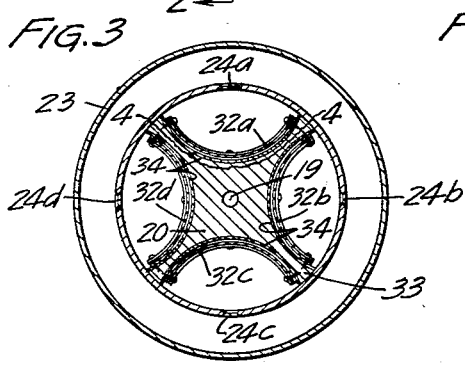
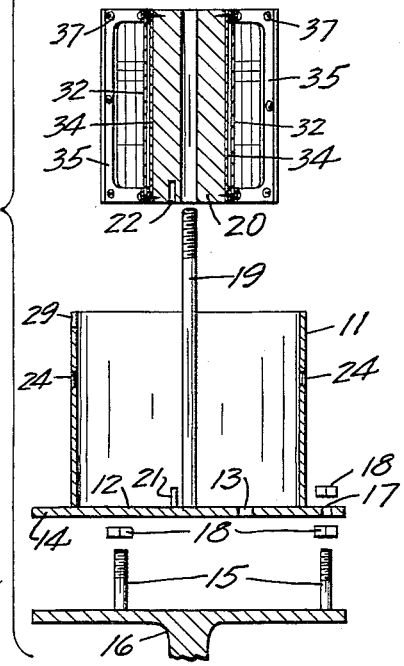
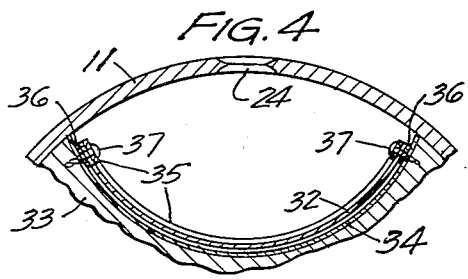
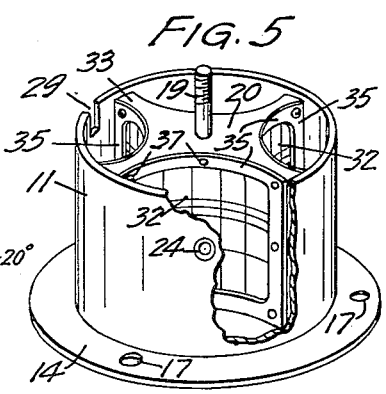
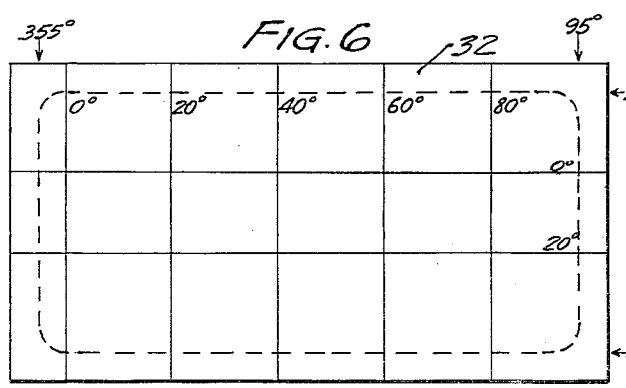
INVENTOR
REYNOLDS MARCHANT
ATTORNEYS United States Patent Office 3,152,253
Patented Oct. 6, 1964

3,152,253
RECORDING DIRECTION FINDER OF BURSTS OF RADIATION
Reynolds Marchant, St. Paul, Minn., assignor to Minnesota Mining and Manufacturing Company, St. Paul, Minn., a corporation of Delaware
Filed Apr. 26, 1956, Ser. No. 580,754
2 Claims. (Cl. 250—83)

This invention relates to a novel detecting and recording device and method for locating and estimating nuclear explosions, as in an atom bomb attack.

After an attack, civil defense officials must be able quickly to determine what facilities such as hospitals, warehouses, etc. in a general target area remain undamaged and available for immediate use. The task is greatly simplified if reasonably accurate knowledge of the location and intensity of the atomic burst is made immediately available.

The present invention provides means for rapidly determining the location and estimating the intensity of an atomic burst. Permanent records of the burst are formed, from which, taken in conjunction with other variable factors such as local weather conditions, the required location and intensity data may quickly be ascertained.

The invention provides detecting and recording apparatus which is completely self-contained and may be placed at any desired location and maintained under any weather or out-door exposure conditions. In its preferred form, the apparatus remains constantly in condition for use irrespective of solar radiation, precipitation, or other exterior conditions. At the same time, the operation of the device is directed and extremely simple.

Briefly, the device operates by admitting into the interior of its housing a restricted portion of radiant energy put out by a nuclear explosion, and recording the same. In the housing interior, the radiant energy strikes a radiation-sensitive screen which is visibly changed at the point struck by the admitted rays of energy. Since the device is properly mounted in suitable orientation with respect to compass bearing, and the radiation-sensitive screen appropriately calibrated for various angles from the site of the mounted device, one is enabled to read directly the angle of azimuth and elevation from which the recorded radiant energy was received. In practice, a plurality of my devices are mounted at various points in and around a target area, therefore, similar records from one or more other suitably oriented and calibrated devices permits accurate spotting of the location of the blast. By considering the distance of a recording device from the blast, the size of the recorded image, as well as variable factors including weather conditions, the yield or size of the explosion can be estimated.

To more particularly enable an understanding of my invention, a preferred embodiment will be described with reference to the illustrative drawings, wherein:

FIGURE 1 is a side view of a recording device.
FIGURE 2 is an exploded view of the plane taken through line 2—2 of FIGURE 1.
FIGURE 3 is a sectional view of the plane taken through line 3—3 of FIGURE 1.
FIGURE 4 is an enlargement of the fragment 4—4 of FIGURE 3.
FIGURE 5 is a fragmentary perspective view of the device with cover removed.
FIGURE 6 illustrates graphically the calibration of various angles on one radiation-sensitive screen.

Referring to the figures, particularly 1, 2 and 5, the housing of the illustrated preferred embodiment includes a cover 10, a casing or approximately cylindrical portion 11, and a flat bottom portion or floor 12. Any sturdy opaque materials, for example, metals, may be used to make the housing. The floor 12 suitably, but not necessarily, is provided with drain ports as at 13 for ready removal of any dirt or any condensed moisture which may find its way into the enclosure.

About the housing is a mounting flange 14, which is illustrated as an extension of the bottom plate 12, and which is cooperatively employed in accomplishing suitable leveling of the device. As illustrated, bolts 15 extending upwardly from a suitable support 16, pass through holes 17 in the mounting flange, and nuts 18 over the bolts on both sides of the mounting flange are used to level the device and to rigidly hold it in level oriented position in space.

In the center of the housing, extending upwardly from the floor 12 thereof, is a shaft 19 over which the inner assembly 20 is adapted to slide when it is placed inside the housing. Means for securing the proper orientation of the inner assembly within the housing may comprise a guide pin 21 extending upwardly from the floor of the housing and adapted to fit in pin recess 22 in the inner assembly 20.

On the cover 10 is attached a transparent radiation-transmitting plastic shield 23, which depends therefrom a sufficient distance to protect sight apertures 24a, 24b, 24c, and 24d in the housing from wind blown water and the like when it is placed thereover in operating position. A hole 25 in the center of the cover is provided to permit the cover to be journaled about shaft 19 for emplacement over the device. The top of the cover 10 is shaped to divert rain and melting snow through ports 26 in an upstanding flange portion 27. Guide projection 28 depending from the cover 10 fits into guide recess 29 in the upper rim of the cylinder portion 11 so that, when the cover is placed in operating position, drain ports 26 are positioned between and not directly above sight apertures 24 in the housing. A nut 30 fitting over shaft 19 and equipped with handle portions 31 is used to fasten the elements of the device together. Over the shaft 19 and between the cover 10 and nut 30, a washer may be interposed, if desired.

Referring now to FIGURES 3 and 5, the inner assembly 20 comprises radiation-sensitive screens 32a, 32b, 32c and 32d, mounted on a central formation 33 which in horizontal cross section has the configuration of a concave polygon, i.e., a polygon with its sides caved inwardly. In the preferred embodiment the horizontal radius of curvature of each of the arcuate shaped screens 32, when the inner assembly is in oriented position within the housing, is such that the center or axis of curvature is approximately coincident with a vertical line through the center of the corresponding sight aperture 24 located in the wall of the housing. The sight aperture, therefore, is substantially equidistant from all points on the recording screen lying in the horizontal plane passing through the aperture. Thermal radiant energy passing through an aperture and impinging upon a radiation-sensitive screen will cause a visible change on the surface thereof. For convenience, vertical lines marking the angles of azimuth, and horizontal lines marking the angles of elevation, may be printed directly on a screen surface, as illustrated in FIGURE 6. By maintaining the horizontal arc of curvature of the screens as illustrated, i.e., by maintaining the axis of curvature approximately coincident with a vertical line through the center of the sight apertures in the housing wall, the vertical lines calibrated on the screen for indicating angles of azimuth may be spaced equally. Impinging thermal radiation entering through a sight aperture will strike the radiation-sensitive surface of a so-curved screen at an azimuth angle normal thereto. Horizontal lines indicating vertical angles or angles of elevation on such an arcuate screen surface, however, must be spaced at greater distances from each other, according to the tangent law, as they indicate angles of greater deviation from the normal or from horizontal radiation (see FIGURE 6).

In practice, it is preferred to employ four radiation-sensitive screens and four sight apertures spaced to receive radiation from any compass direction about the device, as illustrated in the drawings. Each of the four screens in such an arrangement is marked with sufficient lines for azimuth angle readings for at least a full compass quadrant, and preferably marked to permit a slight overlap of readings to insure against nuclear radiation from any section of the horizon going unrecorded. This may be illustrated by considering the screen illustrated in FIGURE 6 and designating it, for purposes of illustration only, as the screen facing the northeast quadrant about a device in oriented position. The screen is marked with indicia lines to permit azimuth angle readings from 355° to 95°. Other screens, for example, would then be marked and positioned for recording radiation within overlapping azimuth angle ranges as follows: from 85° to 185°, from 175° to 275°, and from 265° to 5°. Since the desiderata is for readings of incident rays from explosions which occur at least more than one mile from the device, lines indicating angles of elevation need in practice cover only approximately 40° above horizontal and approximately 20° below horizontal, as illustrated in FIGURE 6, but may cover even less angularity as any specific use might dictate.

In FIGURE 4, a preferred radiation-sensitive screen arrangement is illustrated. Numeral 33 designates the central formation fitted, in arcuate sections, with arcuate surface plate 34. A radiation-sensitive screen or chart 32, suitably mounted on a frame 35, is preferably substantially equidistantly spaced, e.g., about $\frac{1}{16}$ inch or so, from the surface of plate 34 by spacing washers 36. Such spacing, however, is optional. Fastening means such as screws 37 are used to hold the elements of the assembly together in use, and, as is evident, permit easy replacement of charts, if required. This surface plate and chart arrangement is advantageously used to prevent or reduce the possibility of mechanical damage to charts during handling of the inner assembly.

In practice, the housing of my device is first leveled and oriented in space with respect to compass bearing so that the sight apertures 24 face out upon given sections of the horizon to "sense" radiation therefrom. In the illustrated embodiment, each sight aperture would face out upon a quadrant of the horizon about the location of the device. Charts are then disposed about the inner assembly in proper relationship for azimuth readings, as illustrated above, and the assembly slid down shaft 19 in the housing and properly oriented therein with respect to the sight apertures by guide pin 21 and receiving slot 22. In oriented position, each chart is centered on and separated from its respective sight aperture so as to be shielded in large part from all but a limited sight section of radiant energy originating within its respective quadrant. The cover is then fastened on the device to protect the inner assembly from weather elements.

It will be apparent that many modifications of my preferred device are possible without departing from the essential character of my invention. For example, a square housing may be employed with the aperture for admission of radiant energy positioned in the flat sidewalls thereof. Flat radiation-sensitive screens may be disposed in a cylindrical or multisided housing so as to record radiation entering through suitable sight apertures appropriately spaced and located in front of such screens. Of course, lines on the screens indicating various angles should be calibrated appropriately to take into account the angles of incidence by which radiation will strike the screens.

Lenses may be used in a sight aperture to concentrate radiant energy if desired. Further, if desired, the housing may be hermetically sealed, with all elements in proper respective position, and the device can later be oriented in space for use.

In the illustrated preferred embodiment, the sight apertures have a diameter of approximately 0.4 inch, and the arcuate radiation-sensitive screens have a radius of approximately 2.56 inches from the center of the sight apertures; however, other sizes and distances may be used with satisfactory results. It should be noted that, in the preferred embodiment, the ratio of the distance between the screen and aperture to the diameter of the aperture is about 6.4. Ratios between approximately 4 and 7 are believed to give most ideal results in practice. If desired, sight apertures may be made so as to be capable of mechanical adjustment in size as well as in distance from the radiation-sensitive screens.

Many different types of known radiation-sensitive recording screens or charts may be used in my device. The charts must be sufficiently sensitive so as to be changed visibly by, i.e., to record, thermal radiant energy such as transmitted through the atmosphere as a result of an atomic burst. In this respect, it should be noted that devices useful for gaining information about a burst will ordinarily be located a reasonable distance away from the same and usually outside of the over-pressure ring or wave of approximately 2 p.s.i. around the burst. Devices located within the 2 p.s.i. ring ordinarily will be inaccessible for reading, either because of debris about the location thereof, or because of damage to the device.

Depending upon ambient temperature, and whether continuous low intensity radiation such as solar radiation must be distinguished from the pulse type of higher intensity radiation emitted in a nuclear explosion, different characteristics may be required or permissible in a particular chart selected for use. For example, if the highest atmospheric temperature about a device is quite low, say below about 100° F., charts may be used which are visibly changed or activated when absorbed radiation raises them to a temperature above such temperature. Higher ambient temperatures require that the chart material does not change visibly until a temperature above such higher ambient temperature is attained as a result of absorbed radiation. If a chart is shielded from direct solar radiation, e.g., mounted so as to receive radiation only from a restricted portion of the north sky, it may be made sufficiently sensitive so as to be capable of recording radiation of even lower intensity than that from sunlight. On the other hand, if a chart is mounted to sense a quadrant where it is apt to receive solar radiation, i.e., where solar radiation is apt to pass through the sight aperture and impinge upon it, then the chart must be sufficiently less sensitive to continuous solar radiation so as not to be changed visibly thereby even after a period of time, but must, of course, be sufficiently sensitive to pulses of thermal radiation of an intensity above continuous solar radiation so as to record the same.

The sensitivity of charts is largely controlled by such factors as, for example, the characteristic absorptivity of the chart for thermal radiant energy, the mass (weight per unit area) of the chart (of which limited areas are required to be raised in temperature before an optical change will be effected), the specific heat of the chart material, and the rate of dissipation of heat from limited localities thereof. The rate of dissipation of heat from limited localities of the chart, of course, is affected by the radiation emissive properties of such localities, heat conductive properties of the sheet, ambient temperature of its environment, etc. Experimentally it has been determined that a chart suitable for most applications is one which has an activation temperature, i.e., a temperature of visible change, somewhere near 170° F., and which, at an ambient temperature of 35° F., visible changes when reaching a total heat energy of .3 calorie per square centimeter integrated over a 2.5 second interval. However, charts which require less total energy in order to produce a visible change are suitable for use in the detection and recordation of radiation from areas in which the sun does not appear, e.g., a northerly quadrant in the northern hemisphere.

An example of a preferred chart material suitable for use in most applications, including applications where solar energy strikes a limited portion of the same, is a thin sheet material having a total thickness of about .0015 inch and comprising a backing of thin paper, e.g., Monarco paper, the dried radius of a thin coating of a dispersion of ferric stearate and pyrogallic acid in a solution of ethyl cellulose binder upon one side thereof, and a thin layer, about .0001 inch thick, of radiation absorptive pigment, e.g., lamp black, on the reverse or back side. The mass (weight per unit area) of one sheet so constructed was very low, being .0032 gm./cm.$^2$, carbon accounting for only about .00035 gm./cm.$^2$. At an ambient temperature of 35° F., this sheet was visibly changed by a 2.5 second pulse of energy having a steady state value of 7.2 calories per square centimeter per minute. As used in a recording device, this sheet would, for example, record the direction of burst of a one megaton nuclear explosion at a distance up to about seven miles under average city conditions. This sheet is particularly sensitive to high intensity radiation of very short duration, rising rapidly in temperature (attaining a temperature essentially directly proportional to the intensity of impinging energy) in limited areas on which such energy impinges and changing visibly in such areas. On the other hand, continuous direct radiant energy of relatively low-intensity such as that from the sun, which also is absorbed by this chart, is dissipated from limited localities of the chart receiving such energy before sufficient heat build-up over a period of time occurs to cause a visible change in the chart.

Sheet materials of the foregoing type having approximately half of the mass aforenoted have shown an increase of almost 100% in sensitivity to pulse radiation of the nuclear type without any increase in sensitivity to continuous solar radiation. However, such sheets are fragile and difficult to manufacture and use.

In the preferred embodiment of my invention illustrated in the drawings, I have sometimes applied a thin coating of radiation absorptive pigment upon the exposed surface of surface plate 34, and used a heat-conductive metal in fabricating surface plate 34, so as to prevent, insofar as possible, radiant energy emitted from the back side of heated areas of a spaced chart from returning to the chart once it is emitted, and thereby to facilitate dissipation of low levels of heat energy, such as caused by solar radiation, from the chart.

What is claimed is as follows:

1. A recording direction finder of flashes emitting bursts of radiant light and heat, comprising a screen sensitized to such radiation so as to be permanently marked thereby of which the horizontal cross section is essentially a closed figure, a container opaque to such radiation, said container wholly enclosing said screen and capable of being opened to allow access to said screen, said container having openings therein horizontally opposite said screen, spaced in azimuth around the container for admitting radiation to said screen from any compass direction thereabout, each of said openings admitting radiation to said screen over a limited angular range in azimuth.

2. A recording direction finder of flashes emitting bursts of radiation, comprising a container opaque to such radiation, having openings therein spaced in azimuth around the container for admitting radiation within said container from any compass direction thereabout, each of said openings admitting radiation over a limited angular range in azimuth, and a sensitized screen wholly enclosed within said container, made up of a number of parts of cylinders, the axes of which pass substantially diametrally through the respective openings in the container.

References Cited in the file of this patent

UNITED STATES PATENTS

| | | |
|---|---|---|
| 2,472,879 | Bayle | June 14, 1949 |
| 2,544,261 | Gibson | Mar. 6, 1951 |
| 2,562,969 | Tiechmann | Aug. 7, 1951 |
| 2,615,249 | Allard | Oct. 28, 1952 |
| 2,696,050 | Taylor | Dec. 7, 1954 |

FOREIGN PATENTS

| | | |
|---|---|---|
| 732,737 | Great Britain | June 29, 1955 |